United States Patent [19]
Ishikawa et al.

[11] Patent Number: 5,333,071
[45] Date of Patent: Jul. 26, 1994

[54] HOLOGRAPHIC DISPLAY APPARATUS

[75] Inventors: Tomohisa Ishikawa; Yoshinori Akamatsu, both of Mie; Junichi Fukano; Masayuki Hori, both of Kanagawa, all of Japan

[73] Assignees: Central Glass Co., Ltd., Ube; Nissan Motor Co., Ltd., Yokohama, both of Japan

[21] Appl. No.: 811,437

[22] Filed: Dec. 23, 1991

[30] Foreign Application Priority Data

Dec. 28, 1990 [JP] Japan ................................. 2-409311

[51] Int. Cl.$^5$ ........................ G02B 5/32; G03H 1/28; B60Q 1/44
[52] U.S. Cl. ................................. 359/15; 359/22; 359/900; 340/479; 362/80.1
[58] Field of Search ................. 340/479; 362/80.1; 359/13, 15, 22, 24, 28, 32, 900

[56] References Cited

U.S. PATENT DOCUMENTS

| | | | |
|---|---|---|---|
| 4,720,158 | 1/1988 | Kuwayama et al. | 359/22 X |
| 4,892,369 | 1/1990 | Moss | 359/22 |
| 4,916,593 | 4/1990 | Moss et al. | 340/479 |
| 4,966,426 | 10/1990 | Moss et al. | 359/601 |
| 5,101,193 | 3/1992 | Smith et al. | 359/19 |
| 5,106,174 | 4/1992 | Smith | 359/19 |

Primary Examiner—William L. Sikes
Assistant Examiner—David R. Parsons
Attorney, Agent, or Firm—Keck, Mahin & Cate

[57] ABSTRACT

A holographic display apparatus reconstructs an image by projecting a beam of a luminous source to a holographic sheet including a plurality of holograms. The holograms are arranged so that the central axes of images recorded in the holographic sheet are directed in a same direction, in the diverging direction, or in a converging direction. Additionally, each hologram has a first focal distance f1 (mm) and a second focal distance f2 (mm) which are in a relationship such that $f1 \leq f2/28 + 50$ and $f1 < f2$.

9 Claims, 4 Drawing Sheets

HOLOGRAPHIC DISPLAY APPARATUS

BACKGROUND OF THE INVENTION

1. Field of the Invention

The present invention relates to a holographic display apparatus which is applied to vehicle parts such as high mounted stop lamps and direction indicators.

2. Description of the Prior Art

Recently, many automotive vehicles have been provided with high mounted stop lamps to a rear window directly or in the vicinity of it. An integrated type of a luminous source and a housing is mainly used as a high mounted stop lamp. However, such stop lamps are complex and may impose limitations on the design of the automobile. Such stop lamps further include drawbacks such as the decrease of the backward visibility of a driver and the decrease of a free space in the vehicle compartment. In order to improve such drawbacks, a holographic sheet including transparent type holograms has been proposed as a display element of high mounted stop lamps.

However, such a holographic display element yet includes drawbacks that in the event that a point luminous source such as a bulb is used as a luminous source, the element cannot clearly project whole image of the holograms of the holographic sheet, for example, although a central portion of the holographic sheet is light but the peripheral portion of it is dark.

SUMMARY OF THE INVENTION

It is an object of the present invention to provide an improved holographic display apparatus of an improvement of the above-mentioned drawbacks.

A holographic display apparatus in accordance with the present invention comprises a holographic sheet of a transparent type which includes a plurality of holograms therein. The holograms are formed to have a first focal distance f1 (mm) and a second focal distance f2 (mm) which is in a relationship that $f1 \leq f2/28 + 50$ and $f1 < f2$. A luminous source illuminates the holograms which form an image recorded in the holographic sheet.

With this arrangement, a whole virtual image reconstructed by illuminating the holographic sheet is clearly seen from the operator of the next following vehicle. Additionally, a visibility (visible angle) of the virtual image is also largely improved.

BRIEF DESCRIPTION OF THE DRAWINGS

In the drawings, like reference numerals designate like parts and elements throughout all figures, in which.

DETAILED DESCRIPTION OF THE INVENTION

Figure 1:
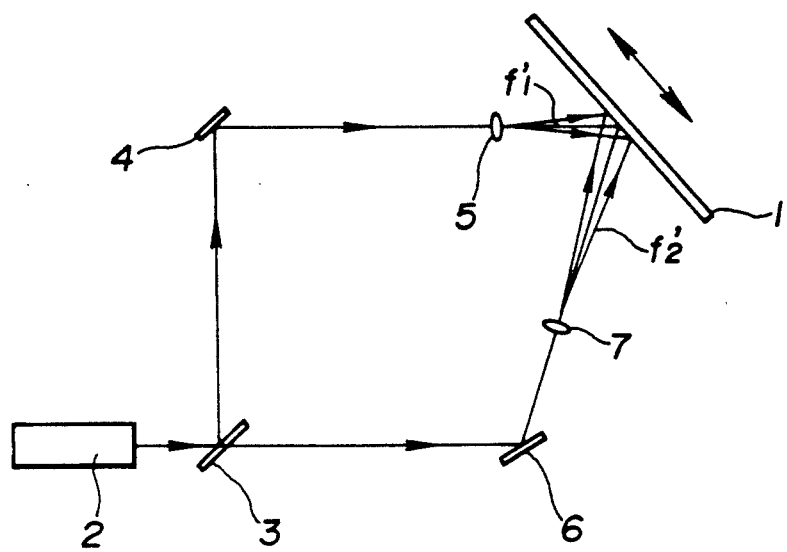
FIG. 1 is a diagrammatic view of an optical system used in producing a holographic sheet of a first embodiment of the holographic display apparatus according to the present invention.
Figure 2:
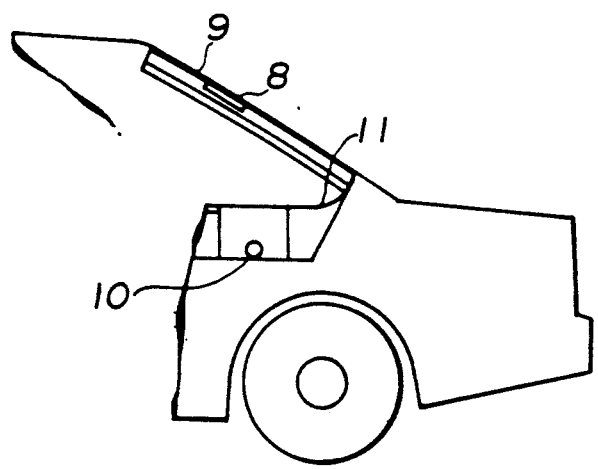
FIG. 2 is a side partial view of a vehicle to which the holographic display apparatus of FIG. 1 is applied as a high mounted stop lamp.
Figure 3:
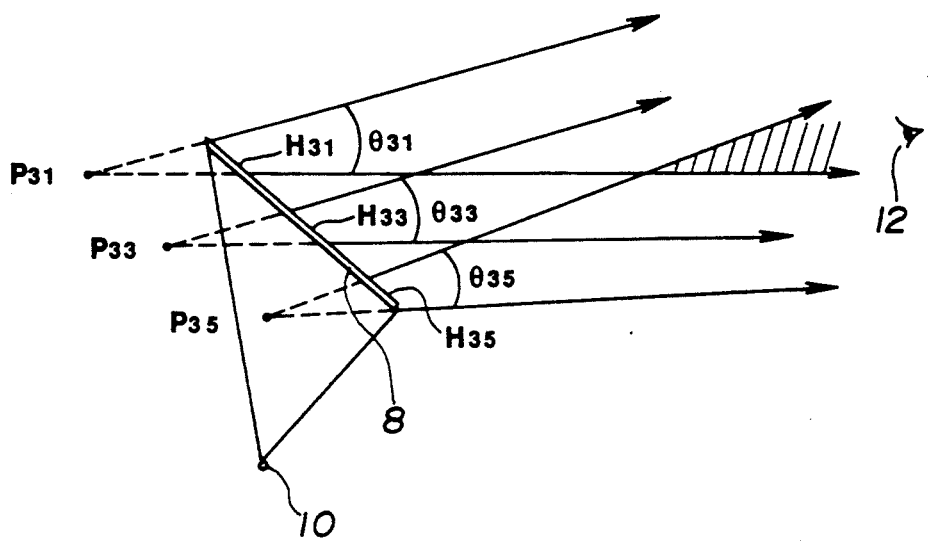
FIG. 3 is a diagrammatic view of an optical system used in the reconstruction of the image recorded in a hologram of FIG. 1.

Referring now to FIGS. 1 to 3, there is shown a first embodiment of a holographic display apparatus according to the present invention.

FIG. 1 shows a diagrammatic view of an optical system for producing a holographic sheet 8 of a transparent type of the first embodiment. An optically transparent polyester film 1 is used as the base of the holographic sheet 8. In advance, a photosensitive materiel, such as dichromated gelatin, is coated on the polyester film and dried. For exposure of the photosensitive layer on the film to light, a laser beam emitted from a suitable laser oscillator 2 such as an argon gas laser oscillator is divided into two beams by a beam splitter 3. One (object beam) of the divided beams is directed to a convex lens 5 disposed at 30 mm distance from the film 1 by a reflective mirror 4. Through the convex lens 5, the laser beam diverges into a spherical wave, which illuminates a part of the photosensitive coating layer of the film 1. The other beam (reference beam) is directed to another convex lens 7 disposed at 100 mm distance from the film 1 by a reflective mirror 6. Through the convex lens 7, the laser beam diverges into a spherical wave, which illuminates the part same as the part illuminated by the object beam from the other direction relative to the object beam. By this process, fine interference fringes are created in the photosensitive layer on the film 1. In order to form a plurality of holograms in the photosensitive layer on the film 1, the film 1 is moved along the arrow of FIG. 1 and in the direction perpendicular to a paper surface of FIG. 1 and illuminated by the laser beams from the two directions at each time. For example, the film 1 is moved and illuminated so as to record 25 holograms $H_{11}, \ldots, H_{33}, \ldots,$ and $H_{55}$ on 25 parts (5 rows $\times$ 5 columns) on the film 1, respectively. After that the photosensitive layer of the film 1 is subjected to usual developing and fixing treatment.

In the above described exposure operation for producing the hologram, the wavelength of the laser beam (type of the laser oscillator) and the angle of the incidence of the laser beam to the film 1 are determined by using the Bragg's equation with consideration of the holographic reconstruction conditions. For example, when the coated film 1 is illuminated with the red light source such as a red light emitting diode and the angle of incidence of the light is 45 degrees, its angle of diffraction is 40 degrees and its wavelength of diffraction is about 660 nm (red), the laser oscillator producing an argon laser beam of 488 nm wavelength is used as a luminous source. The laser beam is divided into two beams. One of the divided beams illuminates the coated film 1 with about 44 degrees of the angle of incidence and the other beam exposes the coated film 1 with 44 degrees of the angle of incidence to be opposite to the former beam (object beam).

The luminous source 2 for exposure is selected so that the Bragg condition is satisfied in a large area of the holographic sheet 8. That is, when one focal distance f1 is fixed and the other focal distance f2 is changed, an interval and an inclination of a lattice surface of a photosensitive layer are largely changed in places when the focal distance f2 is small, and the interval and inclination of the lattice surface in places are suppressed in change when the focal distance f2 is large. Accordingly, by exposing to light under the later condition, a large portion of the holographic sheet 8 is set so that the Bragg condition is satisfied with the luminous source for reconstruction. This increases the visibility of the virtual image of the luminous source by the operator of the next following vehicle. Furthermore, the virtual image is formed nearby the holographic sheet 8. This further increases the visibility for the operator of the next following vehicle.

The holographic display apparatus is used as a high mounted stop lamp by installing the holographic sheet 8 to the rear window glass 9. For example, the sheet 8 is posted on the film side of the laminated glass of the rear window as shown in FIG. 2. A luminous source 10 such as a light emitting diode (LED) for illuminating the holograms is disposed in the vicinity of a rear parcel 11 and generally on the line which passes through the central point of the holographic sheet 8 and a disposed point of the convex lens 7.

In general, a holographic sheet is liable to deteriorate by absorption of moisture. Therefore, it is rather desirable to cover each side of the laminated holographic display element with a transparent protective film or the like. In this regard, it is favorable to modify the laminated glass in FIG. 2 by additionally using another plastic interlayer such that the laminated element is the illustrated interlayer and the additional interlayer. Besides, the holographic display element is covered with a transparent protective film.

With the thus arranged holographic display apparatus, when the beam from the luminous source 10 is modulated into a spheric wave and illuminates the holographic sheet 8, the beam is diffracted by the holograms of the holographic sheet 8 such that the central axes of the diffracted beams are the same in all holograms. Accordingly, a plurality of images by the holograms are formed at different positions, respectively to be directed the same. For example, the holograms H31, ..., H33, ..., and H35 are projected at points P31, ..., P33, ..., and P35, respectively, in the form of the image, as show in FIG. 3. Accordingly, the whole image recorded in the holograms is clearly seen from a point of an eye 12 as shown in FIG. 3, that is, the visibility of the holograms is largely improved.

For the purpose of further improvements of the visibility, the change of the visibility was researched from the holographic sheets which were formed under the condition similar to that in the first embodiment except that each distance f1, f2 between the film 1 and each lens 5, 7 was changed into several distances. As a result of the experiment, a relationship among the focal distances f1, f2 and the visibility was obtained as shown in Table 1. As clearly noted from Table 1, when the holographic sheet 8 is formed so that the distance f1 takes a relatively small value and the distance f2 takes a relatively large value, the visibility of the hologram is increased.

From this, it is noted that the distance f1 should be set to be smaller than the distance f2 (f1<f2).

TABLE 1

| | (Visibility to f1 and f2) | | | | |
|---|---|---|---|---|---|
| f1 f2 | 200 mm | 400 mm | 600 mm | 800 mm | 1000 mm |
| 20 mm | 34.0 | 34.0 | 34.5 | 35.0 | 35.5 |
| 40 mm | 25.5 | 27.5 | 28.0 | 29.0 | 30.0 |
| 60 mm | 19.5 | 21.5 | 23.0 | 24.0 | 25.5 |
| 80 mm | 14.5 | 17.0 | 19.0 | 20.0 | 21.0 |
| 100 mm | 10.5 | 13.0 | 15.0 | 16.0 | 17.5 |
| | | | | | (degrees) |

Figure 4:
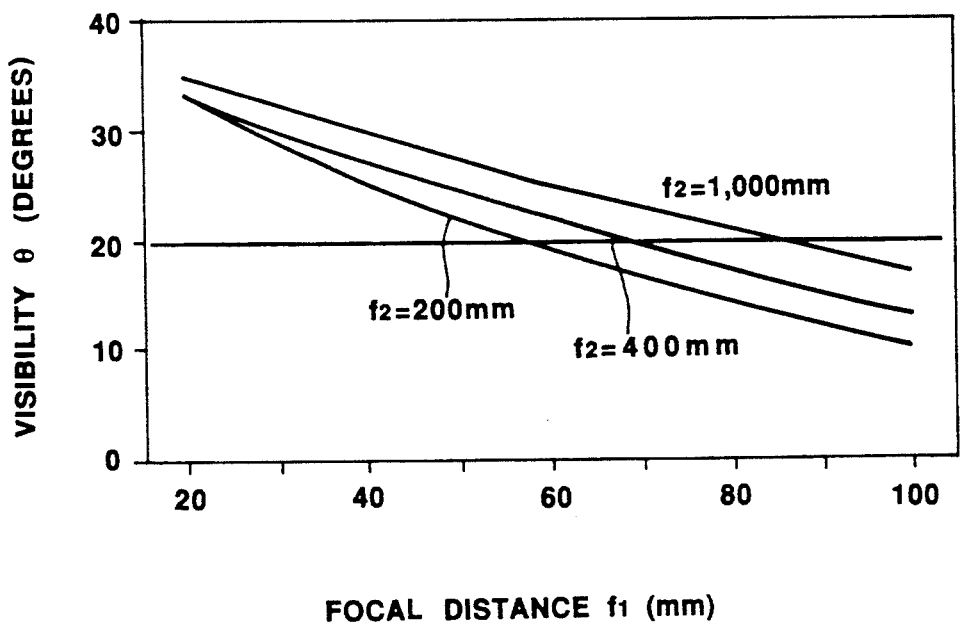
FIG. 4 is a graph which shows a relationship among focal distances f1 and f2 of the holographic sheet and a visible area $\theta$.

Furthermore, according to the General Installation Recommendations in SAE Standard J186, it is required that the visibility of the holographic sheet 8 should be larger than or equal to 20 degrees when used as a high mounted stop lamp. In order to satisfy the specification of SAE Standard J186, it is necessary that the focal distances f1 and f2 of the hologram satisfy the relationship $f1 \leq f2/28 + 50$. The relationship is determined from the condition that $f1 \leq 60$ mm when $f2 = 200$ mm and $f1 \leq 90$ mm when $f2 = 1000$ mm, as indicated in FIG. 4 which is described on the basis of Table 1. In order to ensure the sufficient visibility larger than or equal to 20 degrees, it is necessary to satisfy a relationship that $1000/f1max = \tan 10°$ since the maximum size of one hologram may take the equal size of the rear window glass 9 and the half of a lateral length of the rear window glass 9 may take as 1000 mm. From this, a relationship $f1max = 5681$ mm is derived. It means that maximum distance f1max should be smaller than 5681 mm. Furthermore, even if the holographic sheet is attached to a lower peripheral portion of the window glass, it is necessary that the distance between the luminous source and the holographic sheet takes at least 50 mm. Accordingly, the distance f2 should be set to be larger than or equal to 50 mm ($f_2 \leq 50$ mm).

Referring to FIGS. 5 to 8, there are shown second and third embodiments of the holographic display apparatus according to the present invention.

Figure 5:
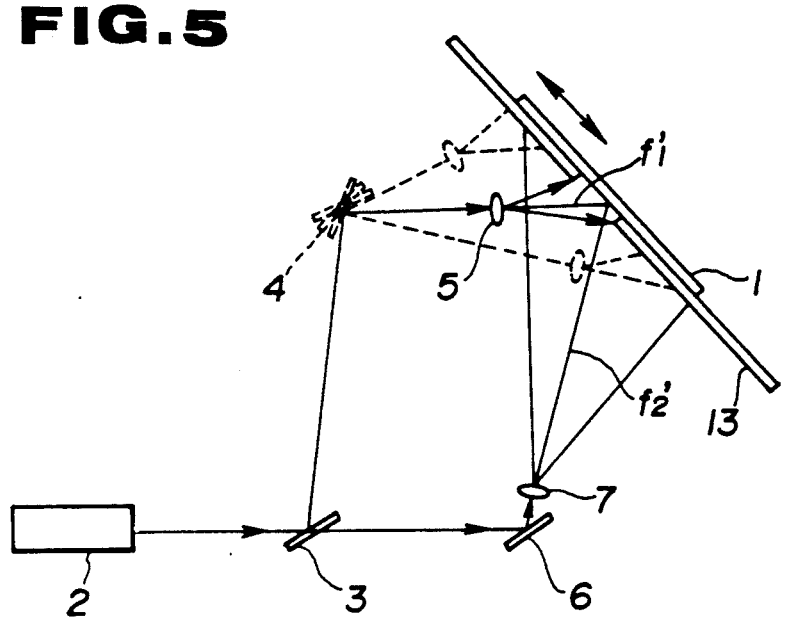
FIG. 5 is a diagrammatic view of an optical system used in producing a holographic sheet of a second embodiment of the holographic display apparatus according to the present invention.

The producing process of holographic sheets 8 used in the second and third embodiments is generally similar to that in the first embodiment except that the holographic sheet 8 of the second embodiment is arranged so that the central axes of the diffracted beams by the holograms of the holographic sheet 8 diverge, and except that the holographic sheet 8 of the third embodiment is arranged so that the central axes of the diffracted beams by the holograms converge. In order to form a plurality of holograms in the holographic sheet 8 of the second embodiment, the producing process of the holograms is modified to be different from the first embodiment. In the concrete, the film 1 is fixed at a predetermined position and the masking plate 13 is slid along the arrow and to the direction perpendicular to paper surface of FIG. 5 while the reflective mirror 4 and the convex lens 5 are changed in position and angle to be interconnected with the movement of the masking plate 13 as shown in FIG. 5. For example, the film 1 is moved and illuminated so as to record 25 holograms H11, ..., H33, ..., and H55 on 25 parts (5 rows×5 columns) on the film 1, respectively. After that the photosensitive layer of the film 1 is subjected to usual developing and fixing treatment.

Figure 7:
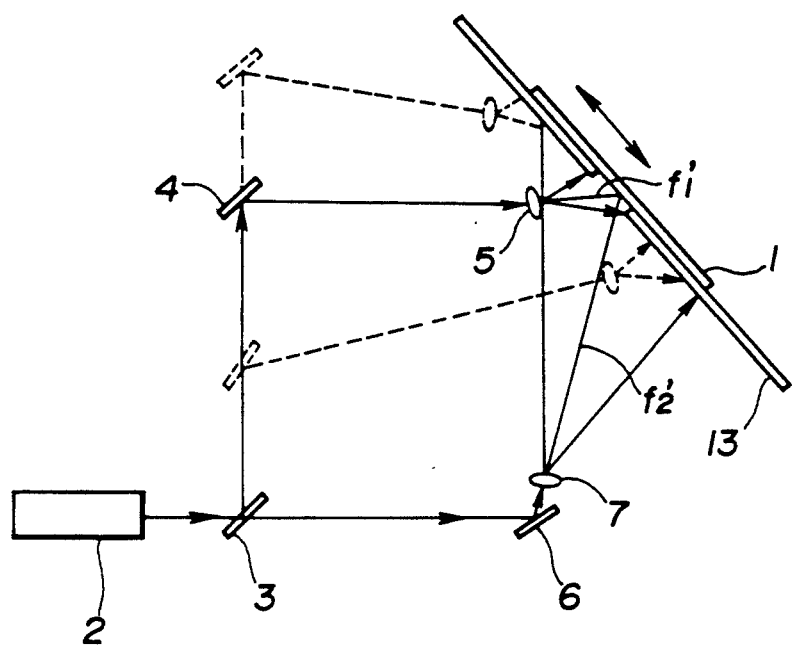
FIG. 7 is a diagrammatic view of an optical system used in producing a holographic sheet of a third embodiment of the holographic display apparatus according to the present invention; and and FIG. 8 is a diagrammatic view of an optical system used in the reconstruction of the image recorded in a hologram of FIG. 7.

On the other hand, in order to form a plurality of holograms in the holographic sheet 8 of the third embodiment, the producing process of the holograms is modified to be different from the first embodiment. The film 1 is fixed at a predetermined position and the masking plate 13 is slid along arrow A and to the direction perpendicular to a paper surface of FIG. 7 while the reflective mirror 4 and the convex lens 5 are changed in position and angle to be interconnected with the movement of the masking plate 13 as shown in FIG. 7. For example, the film 1 is moved and illuminated so as to record 25 holograms $H_{11}, \ldots, H_{33}, \ldots,$ and $H_{55}$ on 25 parts (5 rows × 5 columns) on the film 1, respectively. After that the photosensitive layer of the film 1 is subjected to usual developing and fixing treatment.

Figure 6:
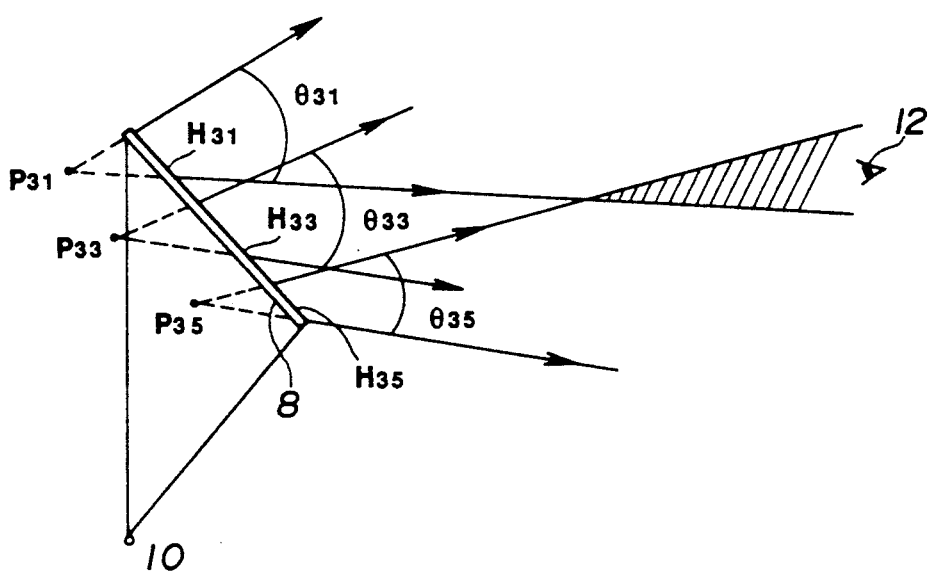
FIG. 6 is a diagrammatic view of an optical system used in the reconstruction of the image recorded in a hologram of FIG. 5.
Figure 8:
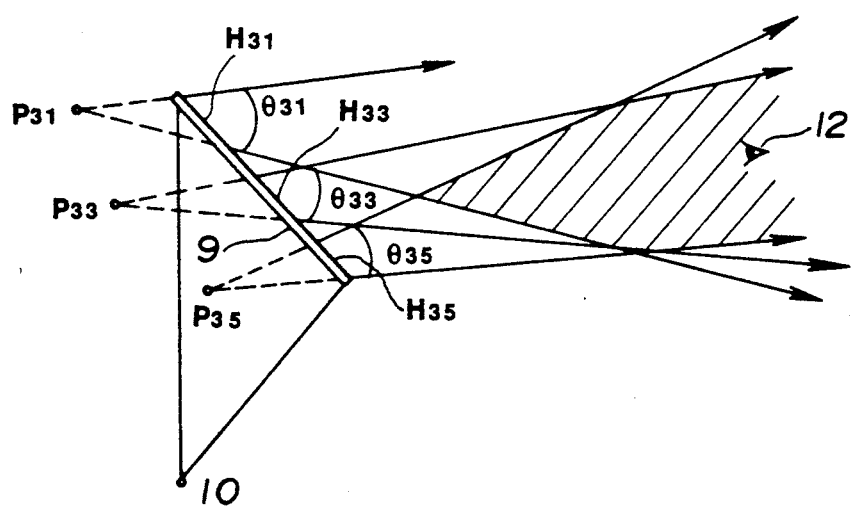

With the thus arranged holographic display apparatus, when the beam from the luminous source 10 is modulated into a spheric wave and illuminates the holographic sheet 8, the beam is diffracted by the holographic sheet 8 such that the directions of the diffracted beams diverge or converge. Accordingly, a plurality of images of the holograms are formed at different positions, respectively, so that the central directions of the diffracted beams of the holograms diverge or converge. For example, the holograms $H31, \ldots, H33, \ldots,$ and $H35$ are projected at points $P31, \ldots, P33, \ldots,$ and $P35$, respectively, in the form of the image, as shown in FIGS. 6 and 8. Furthermore, the other holograms (though not shown) are projected in the form of the image. Accordingly, the whole view of the image is clearly seen from a point of an eye 12, and the visibility of the holograms is improved.

Although the angle of diffraction of the holograms in the second or third embodiment is arranged so that the diffracted beams vertically diverge or converge, it will be understood that the angle of diffraction may be arranged so that the diffracted beams horizontally diverged or converged.

While dichromated gelatin has been used as a photosensitive material in the embodiments of this invention, it will be understood that other materials such as silver halide, a photosensitive polymer and photosensitive resist may be used as a photosensitive material. Furthermore, by using a suitable photosensitive material, the thickness of the hologram sheet can be changed (swelled or contracted) upon the heat treatment or chemical treatment. Accordingly, a suitable hologram is produced by utilizing the above-mentioned properties.

Although a white light source is used as a luminous source for a reconstruction of the hologram in the embodiments, other luminous sources such as a laser beam oscillator, a fluorescent lamp, a cathode ray tube (CRT) may be used as a luminous source. Furthermore, if a plurality of luminous sources or plural kind of luminous sources are applied to the embodiments of the present invention, the visibility of the holographic display apparatus of this invention is further improved.

Furthermore, it will be noted that the holographic display apparatus of the present invention is not limited to the high mounted stop lamp and may be used as a direction indicator. Additionally, the color tone of the holographic display apparatus may be changed into various colors, and the apparatus may be used as a window or partition of buildings.

What is claimed is:

1. A holographic display apparatus, comprising:
   a holographic sheet of a transparent type including a plurality of holograms therein, said holograms being formed from a first lens at a first distance f1 (mm) from said holographic sheet and a second lens at a second distance f2 (mm) from said holographic sheet which are in a relationship such that $f1 \leq f2/28 + 50$ and $f1 < f2$; and
   a luminous source which illuminates said holograms which form an image recorded in said holographic sheet.

2. A holographic display apparatus as claimed in claim 1, wherein said holograms are formed such that beams diffracted by said holograms take one of a first state, in which they are directed in the same direction, a second state, in which they diverge, and a third state, in which they converge.

3. A holographic display apparatus as claimed in claim 1, wherein said holographic sheet is attached to a rear window glass of a vehicle and illuminated by said luminous source which is disposed in the vicinity of a rear parcel of the vehicle so that when said luminous source illuminates said holographic sheet, an image recorded in said holographic sheet is seen from an operator of the next following vehicle.

4. A holographic display apparatus as claimed in claim 1, wherein said luminous source is disposed generally on a line which passes through the central point of said holographic sheet.

5. A holographic display apparatus as claimed in claim 1, wherein the holograms are 25 in number and arranged to form 5 rows and 5 columns.

6. A high mounted stop lamp for an automotive vehicle, comprising:
   a holographic sheet of a transparent type installed to a rear window glass of the automotive vehicle, said holographic sheet including a plurality of holograms which are formed from a first lens at a first distance f1 (mm) from said holographic sheet and a second lens at a second distance f2 (mm) from said holographic sheet which are in a relationship such that $f1 \leq f2/28 + 50$ and $f1 < f2$; and
   a luminous source disposed in the vicinity of a rear parcel of the automotive vehicle and illuminating said holograms so that said holograms form an image recorded in said holographic sheet on receiving beams from said luminous source.

7. A method of producing a holographic sheet of a transparent type for use in a holographic display apparatus comprising the steps of:
   (a) coating a photosensitive material on an optically transparent film; and
   (b) exposing photosensitive material on the film in such a manner that a laser beam is divided into first and second beams by a beam splitter, the first beam being directed to a first convex lens disposed at a first distance f1 (mm) from the film by a first reflective mirror and through the first convex lens, the first beam diverging into a spherical wave illuminating a part of the photosensitive coating layer of the film, the second beam being directed to a second convex lens which is disposed at a second distance f2 (mm) from the film by a second reflective mirror and through the second convex lens, the laser beam diverging into a spherical wave illuminating the same part as that illuminated by the first beam from the other direction relative to the first beam;
   wherein the first distance f1 (mm) and the second distance f2 (mm) are in a relationship such that $f1 \leq f2/28 + 50$ and $f1 < f2$.

8. A method of producing a holographic sheet as claimed in claim 7, wherein said laser beam is an argon laser beam.

9. A method of producing a holographic sheet as claimed in claim 7, wherein said laser beam is an argon laser beam of 488 nm wavelength.

* * * * *